United States Patent [19]
Takebe et al.

[11] Patent Number: 5,768,345
[45] Date of Patent: Jun. 16, 1998

[54] CHANNEL SELECTING CORDLESS TELEPHONE

[75] Inventors: Yoshihisa Takebe, Nagareyama; Hiroyuki Ishida, Ichikawa; Yuichi Bannai, Funabashi; Fumiya Hirayama, Ichikawa, all of Japan

[73] Assignee: Uniden Corporation, Ichikawa, Japan

[21] Appl. No.: 520,894

[22] Filed: Aug. 30, 1995

[30] Foreign Application Priority Data

Jun. 2, 1995 [JP] Japan ................................ 7-137063

[51] Int. Cl.$^6$ .................................................... H04Q 7/20
[52] U.S. Cl. ................... 379/61; 379/58; 455/34.1
[58] Field of Search ................... 379/61, 58; 455/34.1

[56] References Cited

U.S. PATENT DOCUMENTS 4,872,205  10/1989  Smith ........................................ 455/34.1
5,418,839  5/1995  Knuth et al. ............................... 379/61

*Primary Examiner*—Dwayne Bost
*Assistant Examiner*—Nay Maung
*Attorney, Agent, or Firm*—Daniel R. Brown

[57] ABSTRACT

Plurality of radio channels include a first radio channel group having channel(s) permitted to be used only when the radio channels are not being used by other device, a second radio channel group available for communication regardless of whether the radio channels are being used by other device, a base unit and/or a handset unit therein comprises a first memory unit for storing radio channels in first and second radio channel groups, a determining unit for determining whether a specified radio channel is busy, a control unit for specifying a radio channel in the first radio channel group prior to start of call and determining whether the radio channel is busy, selecting the radio channel if not busy, and otherwise one radio channel from the second radio channel group.

24 Claims, 15 Drawing Sheets

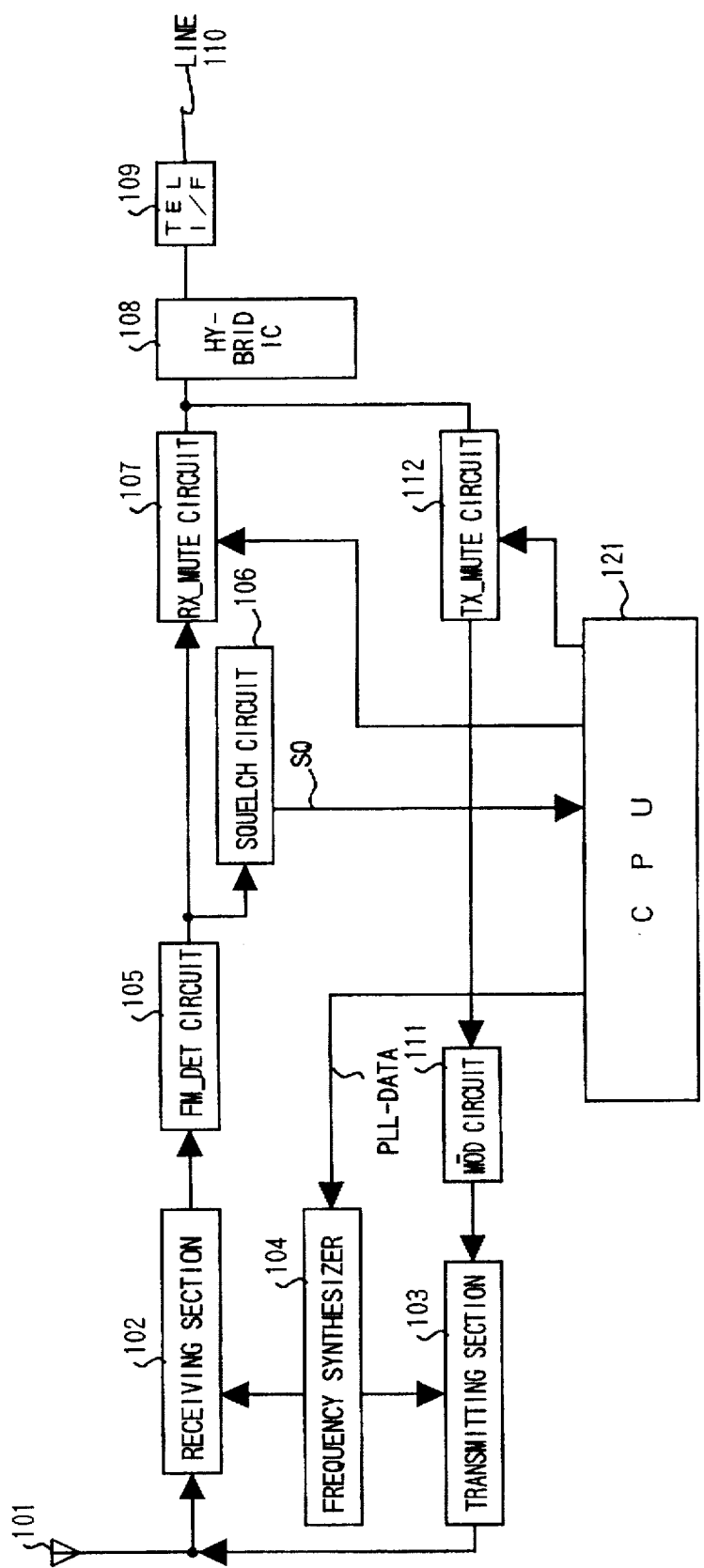
F I G. 1

F I G. 3

| GROUP | 1st CH (A) | 2nd CH (B) | 3rd CH (C) | 4th CH (D) |
|---|---|---|---|---|
| 1 | 17 | 12 | 1 | 5 |
| 2 | 18 | 13 | 2 | 4 |
| 3 | 19 | 14 | 3 | 10 |
| 4 | 20 | 15 | 4 | 7 |
| 5 | 11 | 21 | 5 | 8 |
| 6 | 12 | 22 | 6 | 9 |
| 7 | 13 | 23 | 7 | 1 |
| 8 | 14 | 24 | 8 | 6 |
| 9 | 15 | 25 | 9 | 3 |
| 10 | 16 | 11 | 10 | 2 |

FIG. 16

| CHANNEL NUMBER OF EMBODYMENT | BASE TX FREQUENCY [MHz] | HANDSET TX FREQUENCY [MHz] | CHANNEL NUMBER OF FCC STANDARD |
|---|---|---|---|
| 1 | 46.610 | 49.670 | 16 |
| 2 | 46.630 | 49.845 | 17 |
| 3 | 46.670 | 49.860 | 18 |
| 4 | 46.710 | 49.770 | 19 |
| 5 | 46.730 | 49.875 | 20 |
| 6 | 46.770 | 49.830 | 21 |
| 7 | 46.830 | 49.890 | 22 |
| 8 | 46.870 | 49.930 | 23 |
| 9 | 46.930 | 49.990 | 24 |
| 10 | 46.970 | 49.970 | 25 |
| 11 | 43.720 | 48.760 | 1 |
| 12 | 43.740 | 48.840 | 2 |
| 13 | 43.820 | 48.860 | 3 |
| 14 | 43.840 | 48.920 | 4 |
| 15 | 43.920 | 49.020 | 5 |
| 16 | 43.960 | 49.080 | 6 |
| 17 | 44.120 | 49.100 | 7 |
| 18 | 44.160 | 49.160 | 8 |
| 19 | 44.180 | 49.200 | 9 |
| 20 | 44.200 | 49.240 | 10 |
| 21 | 44.320 | 49.280 | 11 |
| 22 | 44.360 | 49.360 | 12 |
| 23 | 44.400 | 49.400 | 13 |
| 24 | 44.460 | 49.460 | 14 |
| 25 | 44.480 | 49.500 | 15 |

5,768,345

CHANNEL SELECTING CORDLESS TELEPHONE

FIELD OF THE INVENTION

The present invention relates to a cordless telephone system having a base unit and a handset unit, and more particularly to a cordless telephone adapted to the new FCC regulation regarding the radio channel selection to communicate a base unit and a handset unit through the selected radio channel.

BACKGROUND OF THE INVENTION

In the conventional type of a cordless telephone system using frequency bands of 46 MHz and 49 MHz, a number of radio channels which can be used for communication between a base unit and a handset unit has been limited to 10 radio channels because of the FCC (Federal Communications Commission) regulation. However, in the new FCC regulation being effected on Jun. 5, 1995, additional 15 radio channels are allowed to use for communication in a cordless telephone. Accordingly, 25 radio channels are now available for the communication. Design and development of a cordless telephone adapted to the new regulation is now desired, because the newly assigned 15 radio channels give to the cordless telephone more flexibility in the selection of channel to be used. It should be noted that some of the 15 new radio channels permitted by the new regulation are those commonly used by other radio devices (such as a land mobile telephone) other than a cordless telephone.

Therefore the new FCC regulation includes a provision that, if the some of existing radio channels are used by any other radio device including other cordless telephone, such channels in the new 15 radio channels should not be used in communication of cordless telephone, and for this reason there is a problem that specific considerations are required on the radio channel selection for the 15 new radio channels under the restriction. To the contrary, such restriction does not apply to 10 old radio channels. Accordingly, the connection method in the conventional cordless telephone can not be used as it is.

Also when selecting a radio channel, generally a scanning operation for finding an unused radio channel intermittently is well-known for power consumption, but due to increase of a number of radio channels to be scanned from 10 to 25 radio channels, a time required for scanning all the 25 radio channels also increases, which disadvantageously reduces the merit provided by the intermittent operation for scanning.

SUMMARY OF THE INVENTION

It is an object of the present invention to provide a cordless telephone in which selection of radio channels available for communication between a base unit and a handset unit can efficiently be executed in conformity to the new FCC regulation.

It is another object of the present invention to provide a cordless telephone in which a radio channel scanning operation can efficiently be executed in radio channel selection so that power consumption can be relatively reduced in addition to the effect provided by the intermittent scanning operation, even though increase of a number of channels to be scanned 10 to 25 channels.

In the cordless telephone according to the present invention, a plurality of radio channels permitted to be used for communications between the base unit and the handset unit are divided to a first radio channel group having channel(s) permitted to be used for communications with the cordless telephone only when not being used by radio product and a second radio channel group available for communications with the cordless telephone regardless of whether the second radio channel group is being used by the radio product, and a plurality of radio channels belonging to the first radio channel group and a plurality of radio channels belonging to the second radio channel group are stored in a first memory unit of the base unit and/or the handset unit, and in a control unit for the base unit and/or the handset unit, prior to start of the communications, at least one of the plurality of radio channels belonging to the first radio channel group stored in the first memory unit is specified, and the determining unit is demanded to determine whether the selected radio channel is being used by radio product, then the specified radio channel is selected if it is determined that the specified radio channel is not being used by radio product, or otherwise one of the plurality of radio channels belonging to the second radio channel group stored in the first memory unit is selected.

For instance, for responding to the new FCC regulation, the channels conventionally used are allocated to the second channel group, while the channels available anew is allocated to the first, whether there is an unused channel in the first channel group or not is checked, then if there is an unused channel, the channel is selected, and if there is not an unused channel therein, a channel may be selected from the second channel group, so that the cordless telephone enabling a channel selection efficiently according to the new FCC regulation can be realized.

It should be noted that, as for the channel using for communications between the base unit and the handset unit, the channel selected by either the base unit telephone set of the handset unit may be used for both of the base unit as well as the handset unit, or a channel selection may be executed separately in the base unit as well as the handset unit, and the same or different transmission channel may be used for the base unit as well as for the handset unit.

As a result, For instance, for corresponding to the new FCC regulation, the type conventionally used is allocated to the second radio channel group, while the type available anew is allocated to the first radio channel group, and when selecting a radio channel, at first, whether an unused radio channel is present in the first radio channel group or not is checked, then if an unused radio channel is present, the radio channel is selected, and if an unused radio channel is not present therein, a radio channel may be selected from the second radio channel group, so that a cordless telephone enabling a radio channel selection efficiently according to the new FCC regulation can be provided.

And for instance, if a group number to be specified stored in the second memory unit is reset freely when power is turned on, then the group number may be updated to a group number including therein a radio channel used for the communications thereafter whenever necessary, a cordless telephone enabling radio channel selection in more efficient sequence of processing can be provided.

Also a radio channel scanning operation executed in radio channel selection can efficiently be executed within a shorter period of time by means of limiting candidate radio channels to be selected to one line on a radio channel matrix, so that a cordless telephone enabling reduction of power consumption in addition to the effect provided by the intermittent scanning operation can be provided.

And the first radio channel group available anew for communication according to the new FCC regulation is divided further to a plurality of radio channel groups, and any of the groups divided thereto is selected prior to the second radio channel group, which can increase the chance for selecting the first radio channel group, generation of interference in communication can be suppressed, and also a scanning operation in radio channel selection can efficiently be executed within a shorter period of time by means of limiting candidate radio channels to be selected to one line on the radio channel matrix, so that a cordless telephone enabling reduction of power consumption in addition to the effect provided by the intermittent scanning operation can be provided.

And, for instance, if interference due to higher harmonics or interference due to radio channels with adjacent frequencies thereto occur in the radio channel used for communication, a user can change the radio channel by means of pressing down the specified key, so that a cordless telephone enabling resolution of these interference events can be provided.

And also a cordless telephone which can suppress generation of such troubles that the system can not shift to a state of communication if specified group numbers stored in each of the second memory unit of the base unit and the handset unit differ from each other or there is no reply from the other side in which an incoming call is received even if a call has been transmitted from one side in the selected radio channel, can efficiently select a radio channel, and can also more accurately shift to a state of communication, can be provided.

Other objects and features of this invention will become understood from the following description with reference to the accompanying drawings.

BRIEF DESCRIPTION OF THE DRAWINGS

FIG. 1 is a block diagram of a base unit in a cordless telephone according to one embodiment of the present invention;

FIG. 3 is an explanatory view for a radio channel matrix showing radio channel groups which the cordless telephone according to the present embodiment can select for connection between the base unit and the handset unit;

FIG. 16 is an explanatory view for explanation of correspondence between radio channel numbers treated in the present embodiment and those under the FCC regulation as well as of transmission frequencies between a handset unit and a base unit in each radio channel.

DETAILED DESCRIPTION OF THE PREFERRED EMBODIMENTS

Figure 2:
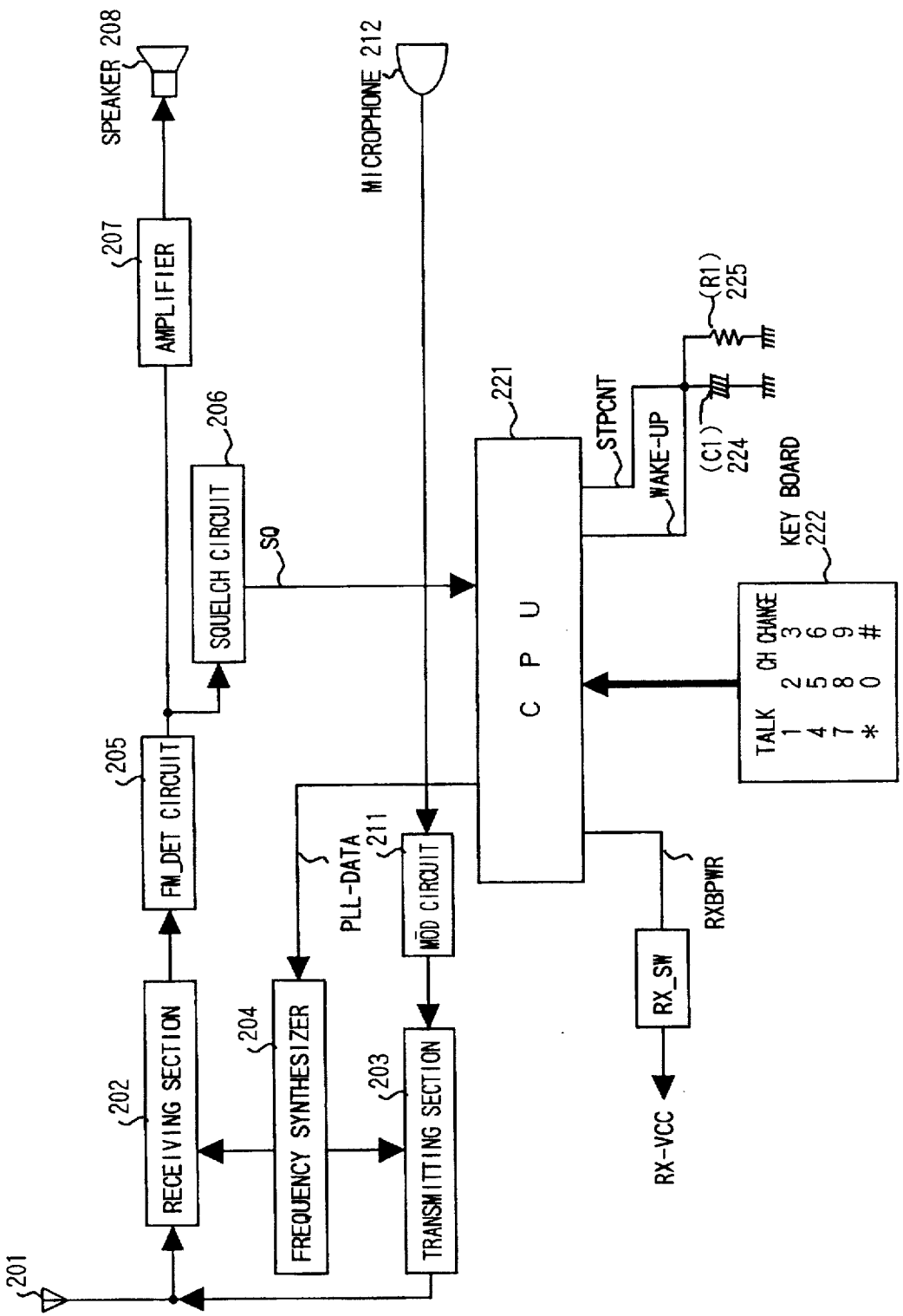
FIG. 2 is a block diagram of a handset unit according to the cordless telephone according to the present embodiment.

Detailed description is made hereinafter for an embodiment of the cordless telephone according to the present invention with reference to the drawings.

[Configuration of a base unit]

FIG. 1 is a block diagram of a base unit in the cordless telephone according to the present invention. In FIG. 1, the base unit in the cordless telephone according to an embodiment of the present invention comprises an antenna 101, a receiving section 102, a transmitting section 103, a frequency synthesizer 104, a frequency detector (FM-DET circuit) 105, a squelch circuit (a determining unit as defined in the claims) 106, a receiving mute circuit (RX-MUTE circuit) 107, a hybrid IC 108, a line interface (TEL I/F) 109, a modulation circuit (MOD circuit) 111, a transmission mute circuit (TX-MUTE circuit) 112, and a CPU (a control unit as defined in the claims) 121.

It should be noted that, in FIG. 1, PLL-DATA is data for a phase synchronizing loop circuit given from the CPU 121 to the frequency synthesizer 104, and SQ is a result of squelch checking of a received signal executed in the squelch circuit 106. Also it should be noted that the base unit is connected through the line interface 109 to the line 110.

[Configuration of a handset unit]

FIG. 2 is a block diagram showing a handset unit in the cordless telephone according to the present embodiment. In FIG. 2, the handset unit in the cordless telephone according to the present embodiment comprises an antenna 201, a receiving section 202, a transmitting section 203, a frequency synthesizer 1204, a frequency detector (FM-DET circuit) 205, a squelch circuit (a determining unit as defined in the claims) 206, an amplifier 207, a speaker 208, a modulation circuit (MOD circuit) 211, a microphone 212, a CPU (a control unit as defined in the claims) 221, a keyboard 222, a receiving section power switch (RX-SW) 223, an electrolytic capacitor 224 (capacity: C1), and a resistor 225 (resistance value: R1).

It should be noted that, in FIG. 2, PLL-DATA is control data given from the CPU 221 to a phase synchronizing loop (PLL) circuit in the frequency synthesizer 204, and SQ is a result of squelch check of a received signal executed in the squelch circuit 206. Also RXBPWR is a control signal to the receiving section power switch 223, and RX-VCC put under ON/OFF control for power supply to a receiving system such as a receiving section 202 is outputted from the receiving section power switch 223.

Furthermore, the electrolytic capacitor 224 and the resistor 225 form a circuit for controlling an intermittent operation in scanning, and when a stop control signal STPCNT is set to "H" level, the electrolytic capacitor 224 is charged, and when the stop control signal STPCNT is set to an open potential, the electric charge is released at a time constant (C1 ×R1), and when a signal WAKE-UP is set to "H:active" level, the circuit returns to the sleep mode until the signal is set to "L" level in a certain period of time based on the time constant.

[Channel matrix]

FIG. 3 shows a radio channel matrix showing a group of radio channels which can be selected by the cordless telephone according to the present invention for connection between a base unit and a handset unit. This radio channel matrix is stored in a memory unit (a first memory unit as defined in the claims) realized by a ROM or the like not shown herein.

A row in the radio channel matrix is allocated to each radio channel group, and a line corresponds to a specified group number stored in the memory unit (a second storage unit as defined in the claims) (not shown herein by realized by SRAM or the like). It should be noted that in this embodiment contents stored in the memory unit is updated, after initial setting upon power turn ON and each time a call is placed, to a specified group number used in the call. For this reason, at a time point when a radio channel to be used for calling is selected, a specified group number including a radio channel used in a preceding call has been stored.

A first radio channel group is a group of new radio channels which have become available because of introduction of the new FCC regulation, the radio channel group can not be selected when the radio channels are used by a device other than the cordless telephone, and this group consists of group A and group B. A second radio channel group is a group of radio channels having been allocated under the existing FCC regulation, which is a group of old radio channels selectable regardless of whether the radio channels are being used by other device or not, and comprises group C.

Furthermore a third radio channel (group D) is a group including the same elements as those of the second radio channel group (group C), which is added to the final row of a radio channel matrix, and elements of each line in the row (group D) are the same as those decided in a row to which the second radio channel group in the radio channel matrix is allocated according to a specified group number just one ahead of a specified group number corresponding to the line in a sequence for cyclically changing specified groups.

Herein a sequence for cyclically changing a specified group is applied when a radio channel is changed while a user is talking over a telephone line, and an instruction for changing a radio channel is issued when a radio channel change key provided on the keyboard 222 of a handset unit is pressed down.

A user wants to change a radio channel generally because disturbance by higher harmonics or that by a radio channel for an adjoining frequency is generated, and a sequence for changing a radio channel is set so that the disturbances as described above will be dissolved. Namely in this embodiment, a sequence for cyclically changing a specified group is set as described below:

1→7→4→2→10→3→9→6→8→5→1

It should be noted that the third radio channel group (group D) is included in a radio channel matrix because, in a method of selecting a radio channel in the present embodiment as described below, if there is no unused radio channel in the first radio channel group (group A and group B), a radio channel having a specified group number in the second radio channel group (group C) is selected, but a case where there is a difference in a specified group number between a base unit and a handset unit or a case where, even if a call is placed through the current radio channel, there is no response from a receiving side is assumed, and a radio channel is selected from the third radio channel group (group D) in such a case. Namely, a radio channel having a preceding specified group number is selected according to a sequence for changing a specified group.

An order of rows in the radio channel matrix shown in FIG. 3 (1st, 2nd, 3rd and 4th) indicates an order of preference according to which each radio channel group is applied when selecting a radio channel, and for this reason, scanning is executed in the order of group A to group B, group C, and then group D. However, in actual operation, as described later, a scanning operation in a handset unit and a base unit is executed to radio channels in groups A, B, and C, and scanning is not executed to group D.

[Scanning operation in a handset unit]

Next a scanning operation in a handset unit is described with reference to a timing chart shown in FIG. 4.

At first, at timing T1 (Refer to FIG. 4(f)), the signal WAKE UP is set to "L" level due to interruption from outside such as pressing down of the talk key (Refer to FIG. 4(a)), and oscillation of clocks for driving the CPU 221 is started (Refer to FIG. 4(b)).

When time tb as a time required for stabilization of clock oscillation output from a clock oscillator has passed, namely at timing T2, the control signal RXBPWR is outputted from the CPU 221 at "L:active" level to turn ON power supply for a receiving system, and also the stop control signal STPCNT is outputted at "H" level to charge the electrolytic capacitor 224 for executing the next intermittent operation.

Then, after power supply for a receiving system has been turned ON, at timing T3 when time tc required for stabilization of a supply power voltage (Vcc) for a PLL HIC circuit has passed, PLL-DATA is supplied from the CPU 221 to the frequency synthesizer 204. Herein the PLL-DATA is frequency data for a radio channel corresponding to a specified group number in group A in a radio channel matrix.

When a specified period of time has passed after output of PLL-DATA, squelch check by the squelch circuit 206 is executed. A squelch signal SQ as a result of squelch check is received by the CPU 221, and determination is made as to whether the current radio channel is unused or not.

Furthermore, output of PLL-DATA is similarly executed also to radio channels having a same specified group number in group B and group C in the radio channel matrix. It should be noted that time td, te, tf based on considerations to time required for stabilization of a receiving operation in a receiving system as well as of the squelch checking operation in the squelch circuit 206 is set as a time interval for output of PLL-DATA.

Then at timing T5 when time tf has passed after output of frequency data (PLL-DATA) for group C has passed, it is regarded that the scanning operation is over, and the CPU 221 sets the control signal RXBPWR to "H" level and the stop control signal STPCNT to an open potential, and then stops oscillation of clock and enters the stop mode.

Herein radio channel selection in a handset unit is executed as described below. Namely, if a radio channel having a specified group number in group A is unused, the radio channel is selected, and if the radio channel is busy, the selecting operation shifts to group B. If a radio channel having a group number in group B is unused, the radio channel is selected, and if the radio channel is busy, the selecting operation shifts to group C. When selecting a radio from group C, a radio channel having a specified group number is selected regardless of a result of determination by the squelch circuit 206 (whether the radio channel having a specified group is unused or busy).

Figure 4:
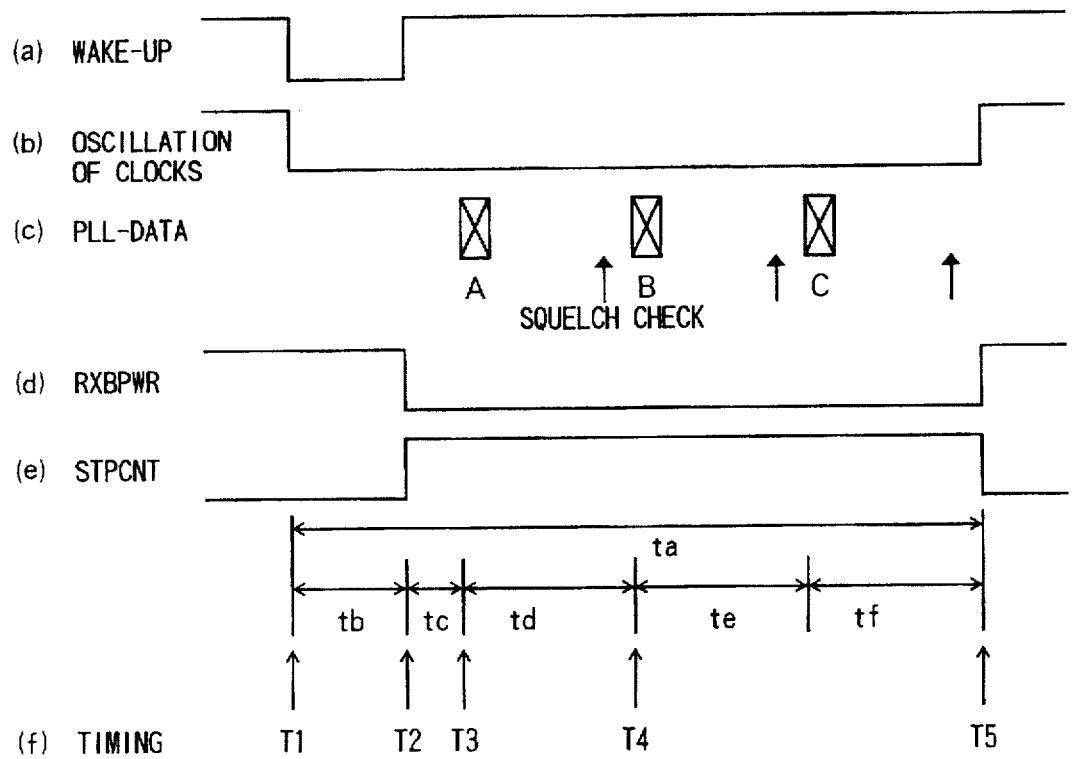
FIG. 4 is a timing chart for explanation of a scanning operation in a handset unit.

It should be noted that actual time intervals in the timing chart shown in FIG. 4 are as described below:

ta=117 [msec]; tb+tc+td+te+tf tb=17 [msec]; Time required for stabilization with clock oscillation tc=10 [msec]; Time required for stabilization of Vcc for PLLIC td=30 [msec]; Time required for stabilization of receiving as well as of squelch te=30 [msec]; Time required for stabilization of receiving as well as of squelch tf=30 [msec]; Time required for stabilization of receiving as well as of squelch As described above, in a scanning operation in a handset unit, candidates for a radio channel to be selected are limited to one line in a radio channel matrix, namely to one radio channel in each radio channel group of group A, group B, and group C, so that an scanning operation can efficiently be executed within a short period of time, and also power consumption can be reduced because the scanning operation is executed intermittently.

[Scanning operation in a base unit]

Figure 5:
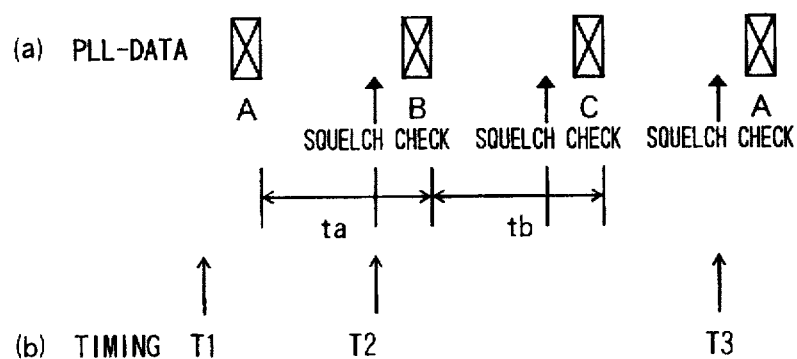
FIG. 5 is a timing chart for explanation of a scanning operation in a base unit.

Next description is made for a scanning operation in a base unit with reference to the timing chart shown in FIG. 5.

At first, at timing T1 (Refer to FIG. 5(b)), PLL-DATA is supplied from the CPU 121 to the frequency synthesizer 104. Herein the PLL-DATA is frequency data for a radio channel corresponding to a specified group number in group A in the radio channel matrix.

When a specified period of time has passed after output of PLL-DATA, squelch check is executed by the squelch circuit 106. The squelch signal SQ as a result of squelch check is received by the CPU 121, and determination is made as to whether the current is unused or busy.

Furthermore, output of PLL-DATA is similarly executed to radio channels having the same specified group number in group B and group C in a radio channel matrix, and the scanning operation is executed repeatedly in the order of group A, group B, group C and then group A. It should be noted that time intervals ta, tb based on considerations to time required for stabilization of a receiving operation in a receiving system as well as of an squelch check operation in the squelch circuit 106 are set as a time interval for output of PLL-DATA.

Herein radio channel selection in a base unit is executed as described below. Namely, if a radio channel having a specified group number in group A is unused, the current radio channel is selected, and if the current radio channel is busy, a selecting operation shifts to group B. If a radio channel having a specified group number is unused, the current radio channel is selected, and if the radio channel is busy, the selecting operation shifts to group C. When selecting a radio channel from group C, a radio channel having a specified group number is selected regardless of a result of determination by the squelch circuit 106 (whether a radio channel having the specified group number is unused or busy).

It should be noted that actual time intervals in the timing chart shown in FIG. 5 are as described below:

ta=30 [msec]; Time required for stabilization of receiving as well as of squelch tb=30[msec]; Time required for stabilization of receiving as well as of squelch.

As described above, in a scanning operation in base unit, candidates for radio channel selection are limited to one line in a radio channel matrix; namely one line in each radio channel group of group A, group B, and group C, so that a scanning operation can efficiently be executed within a short period of time.

[Sequence for connection between a handset unit and a base unit]

Next description is made for a sequence for connection between a handset unit and a base unit. At first, description is made for a general operation for connecting a base unit to a handset unit or vice versa. It should be noted that a base unit becomes a calling side in a case of call connection when an incoming call is placed and bell sounds or in a case of connection for answer, and a handset unit becomes a calling side in case of call connection when a talk key is pressed down, or in case of remote connection or the like.

When either a base unit or a handset unit becomes a calling side, whether any unused radio channel is present in each radio channel group (each of group A, group B, and group C) is checked by means of the scanning operation as described above. From the calling side, transmission of code is executed using the unused radio channel confirmed through the scanning operation as a transmission radio channel, and if ACK code returns from the called side, connection for call is effected using the radio channel continuously.

If ACK code does not return from the called side, it is determined that the transmission radio channel in the calling side is busy, and code transmission is repeatedly executed by using other unused radio channel as a transmission radio channel.

Figure 6:
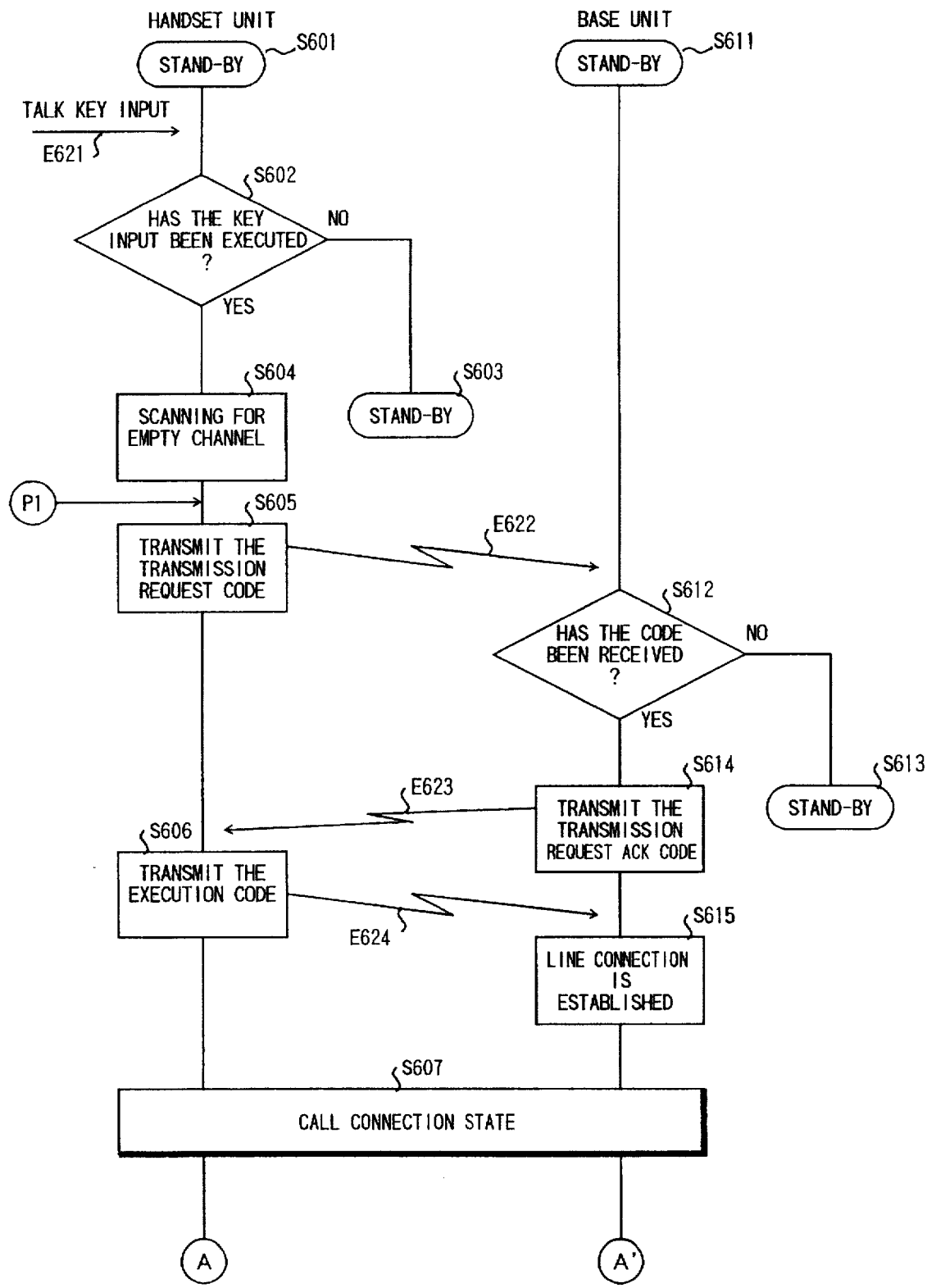
FIG. 6 is a flow chart showing processing in a handset unit as well as in a base unit from talk key input in the side of handset unit until call connection is established.

FIG. 6 is a flow chart showing processing in a handset unit as well as in a base unit from talk key input in the handset unit until establishment of call connection. At first, when the handset unit is in the stand-by state (step S601), if a talk key input is pressed down (event E621), the operation goes to step S604 depending on a result of determination in step S602. Also in determination in step S602, the stand-by state is continued until the key input is executed.

Then in step S604, the "scanning operation in a handset unit" described above is executed. Namely, determination is made as to whether a radio channel having a specified group number stored in the second memory unit in the handset unit is unused or not is executed by the squelch circuit 206 for each of the first radio channel group (group A, group B) and second radio channel group (group C).

In step S605, transmission request code is successively transmitted to a base unit using an unused radio channel in the first group (group A, group B), or a radio channel having a specified group number in the second radio channel group (group C) or third radio channel group (group D) (event E622).

In a base unit, if transmission request code is transmitted when the base unit is in the stand-by state (step S611), an operation goes to step S614 according to a result of determination in step S612. Also in determination in step S612, the stand-by state is continued until the code is received.

In step S614, transmission request ACK code indicating that transmission request code from a handset unit has been received is transmitted to the handset unit (event E623). It should be noted that, in a case where transmission request code from a handset unit does not reach a base unit due to such a trouble in electric wave propagation or in a case where a call comes in and bell sounds just before the transmission is acknowledged, the transmission request ACK code is not transmitted.

When the handset unit acknowledges the transmission request ACK code from the base unit, execution code is transmitted to the base unit in step S606 (event E624). When the base unit accepts the execution code, line connection is established in step S615, and call connection in step S607 is effected.

Figure 7:
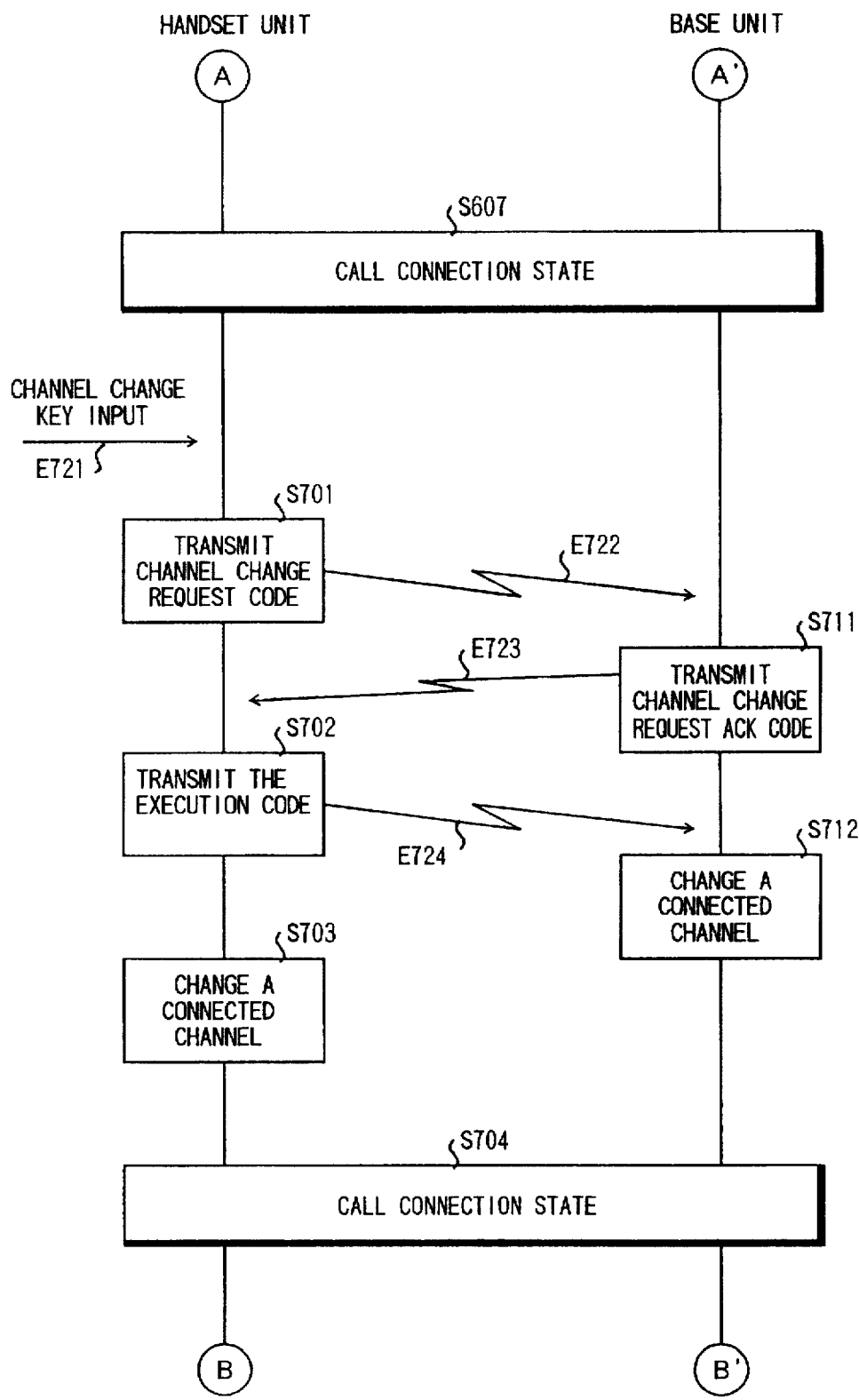
FIG. 7 is a flow chart showing a sequence for changing a radio channel when call connection has been established.

FIG. 7 is a flow chart showing a sequence for changing a radio channel when the radio channel is in call connection state. It should be noted that, although the following description is limited to radio channel change during call, radio channel change can be executed also during remote connection (control for an automatic answering telephone function of a base unit from a handset unit) or during call screen (automatic response when a call is received) connection.

At first, when the call connection state (step S607) has been established, if a radio channel change key provided on the keyboard 222 of the handset unit is pressed down (event E721), in step S701, a group number corresponding to a radio channel currently being selected is changed to a radio channel corresponding to a group number after change of the second radio channel group according to the sequence for cyclically changing a specified group described above, so that radio channel change request code is transmitted to the base unit (event E722).

In the side of base unit, when radio channel change request code is accepted, in step S711, radio channel change request ACK code is transmitted to a handset unit (event E723).

Then in the side of handset unit, when the radio channel change request ACK code from the base unit is accepted, in step S702, execution code is transmitted to the base unit (event E724). When the base unit accepts the execution code, a connected radio channel is changed in step S712, also a connected radio channel is changed in the side of handset unit in step S703, and the call connection state in step S704 is restored.

Figure 8:
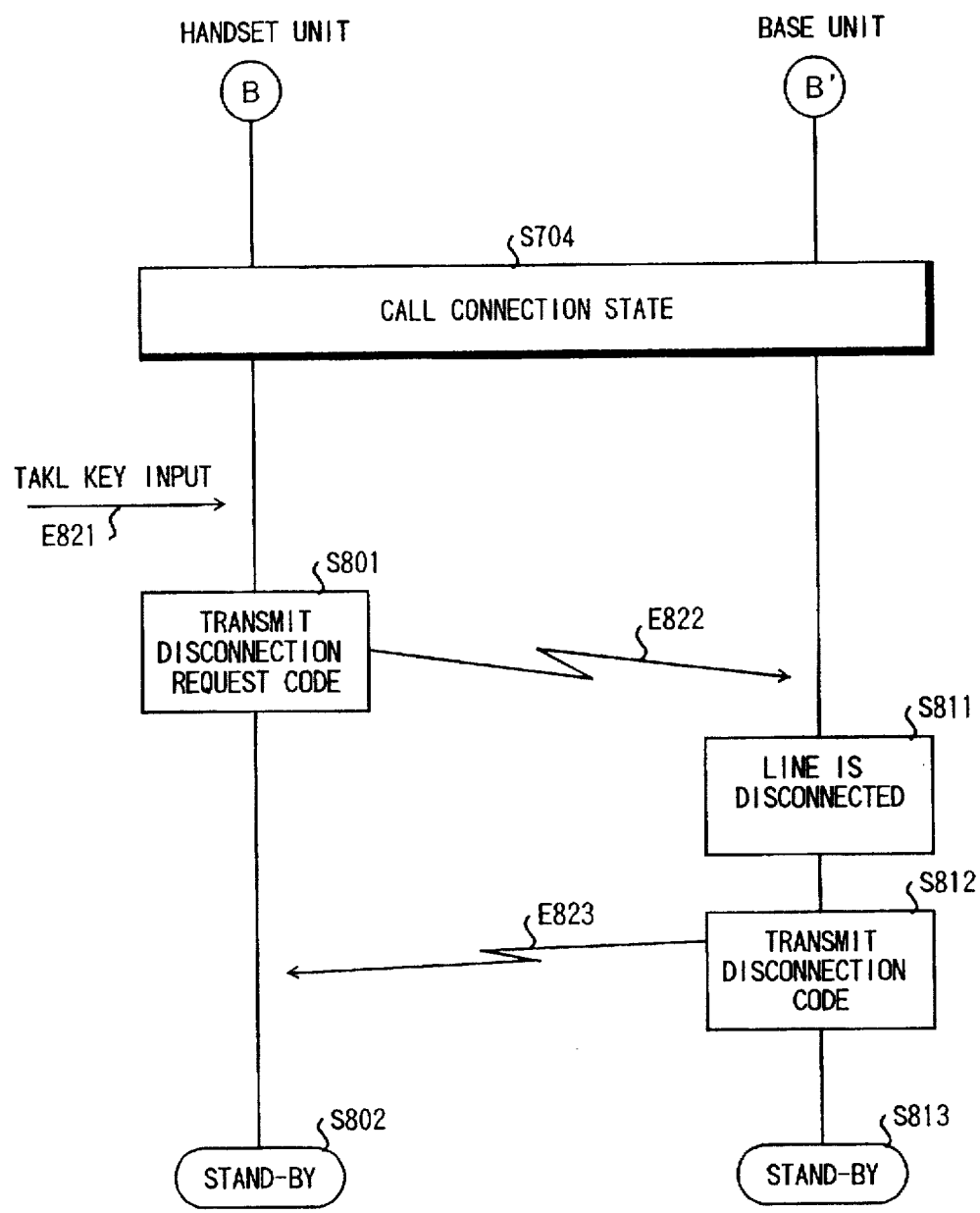
FIG. 8 is a flow chart showing a sequence for disconnecting a line in a state where call connection has been established.

FIG. 8 is a flow chart showing a sequence for disconnecting a line on which call connection has been established. At first, a base unit and a handset unit are in the call connection state (step S704), if the talk key is pressed down (event E821), in step S801 disconnection request code is transmitted to the base unit (event E822).

In the side of base unit, when the disconnection request code is accepted, the line is disconnected in step S811, in step S812, disconnection code is transmitted to the handset unit (event E823), and the base unit returns to the stand-by state (step S813). Also in the side of handset unit, when the disconnection code transmission is accepted from the base unit, the handset unit returns to the stand-by state (step S802).

Figure 9:
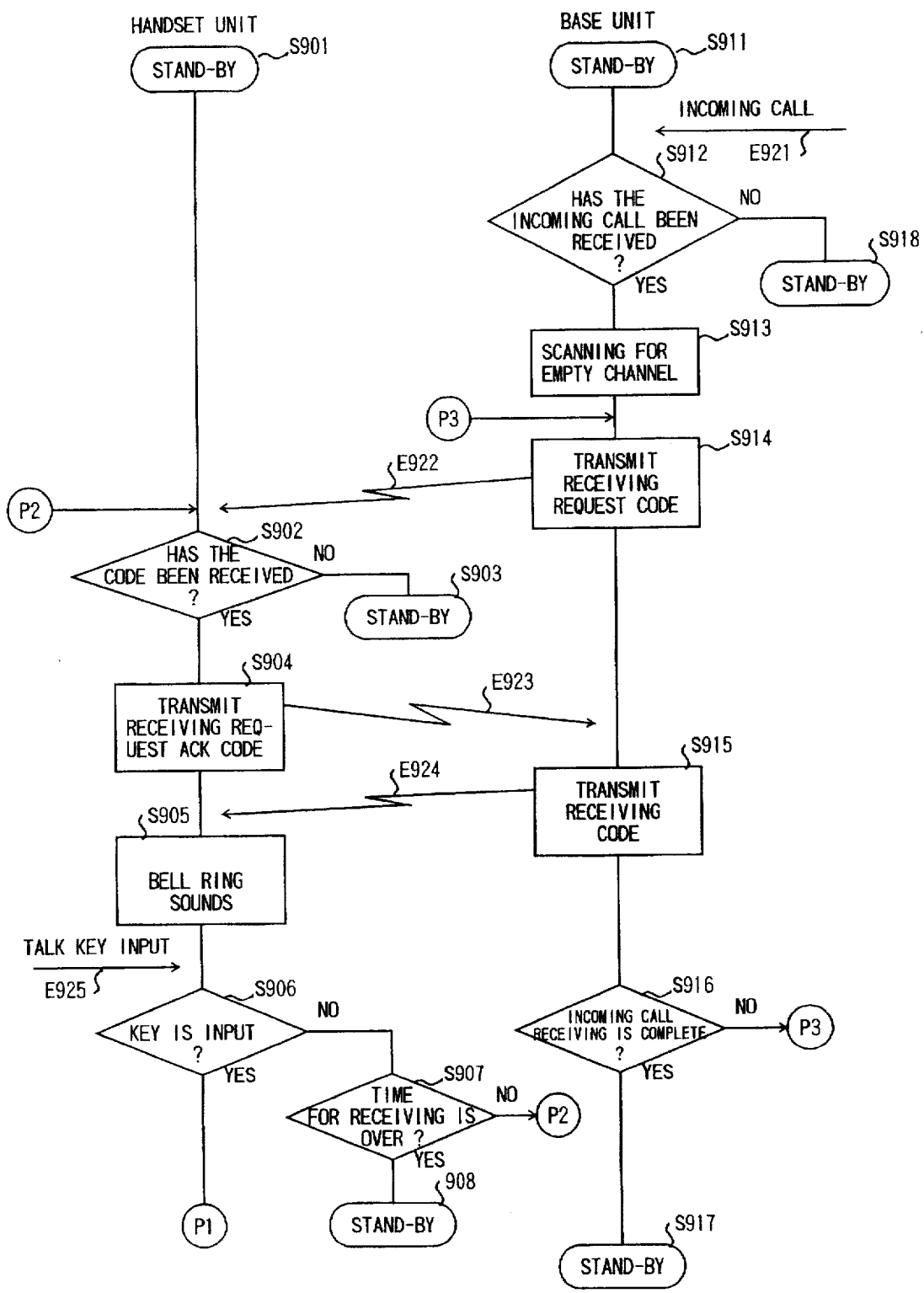
FIG. 9 is a flow chart showing processing in the base unit as well as in the handset unit from a timing when an incoming call is received in the base unit side until call connection is established.

FIG. 9 is a flow chart showing processing in a handset unit as well as in a base unit from a timing when an incoming call comes in and bell sounds in the side of base unit until call connection state is established. At first, when the base unit is in the stand-by state (step S911), if an incoming call is received (event E921), operation goes to step S913 according to a result of determination in step S912. In determination in step S912, the stand-by state is continued until incoming call placement or the like occurs.

Next, in step S913, the "scanning operation in the base unit" described above is executed. Namely determination as to whether there is any unused radio channel or not is executed by the squelch circuit 106 for the first radio channel group (group A, group B) and second radio channel group (group C) according to a specified group number stored in the second memory unit in the base unit.

In step S914, receiving request code is successively transmitted to the handset unit (event E922) using a radio channel recognized as unused in the first radio channel group (group A, group B) and second radio channel group (group C) or a radio channel having a specified group number in the third radio channel group as a transmission radio channel (event E922).

In the side of handset unit, when the handset unit in the stand-by state (step S901), if receiving request code is received, operation goes to step S904 according to a result of determination in step S902. Also in determination in step S902, the stand-by state is continued until an event such as code receiving occurs.

In step S904, receiving request ACK code indicating that receiving request code from a base unit has been accepted is transmitted to the base unit (event E923). It should be noted that, if the transmission request code from the base unit does not reach the base unit due to such a trouble as fault in electric wave propagation or the like, the receiving request ACK code is not transmitted.

In the side of base unit, when the receiving request ACK code from the handset unit is accepted, in step 915, receiving code is transmitted to the handset unit (event E924). Then in step S916, determination on completion of incoming call receiving is executed. If not complete in step S916, and operation returns to step S914, receiving request code is transmitted again, while, if complete, the base unit returns to the standby state (step S917).

On the other hand, in the side of handset unit, when transmission code from a base unit is accepted, in step S905, bell ring sounds from a bell speaker of the handset unit. Then the user is alerted by the bell ring from the handset unit and presses down the talk key (event E925).

Next in step S906, determination is made as to whether key input has been executed or not, and if key input is confirmed, operation goes to step S605 in FIG. 6. If key input is not confirmed, operation goes to step S907, and determination is made as to whether time for receiving is over or not. If the time is not over, operation returns to determination in step S902, and if the time is over, the operation returns to the stand-by state.

[Detailed description of radio channel selection when a handset unit is a calling side]

General contents of a processing flow from talk key input in the side of handset unit until establishment of call connection was described above with reference to FIG. 6, but herein detailed operations in radio channel selection in a sequence for call connection when a handset unit is a calling side is described with reference to FIG. 10 to FIG. 13.

At first, when a talk key input is pressed down (Refer to FIG. 10(a)), the control signal RXBPWR in the handset unit is set to "L:active" level with power voltage supply for a receiving system turned ON (Refer to FIG. 10(b)), and at timing T1 (Refer to FIG. 10(f)), scanning for checking an unused radio channel by means of squelch check by the squelch circuit 206 is executed. Scanning is executed according to a specified group number stored in the second memory unit for a corresponding radio channel in the first radio channel group (group A, group B), and second radio channel group (group C).

Figure 10:
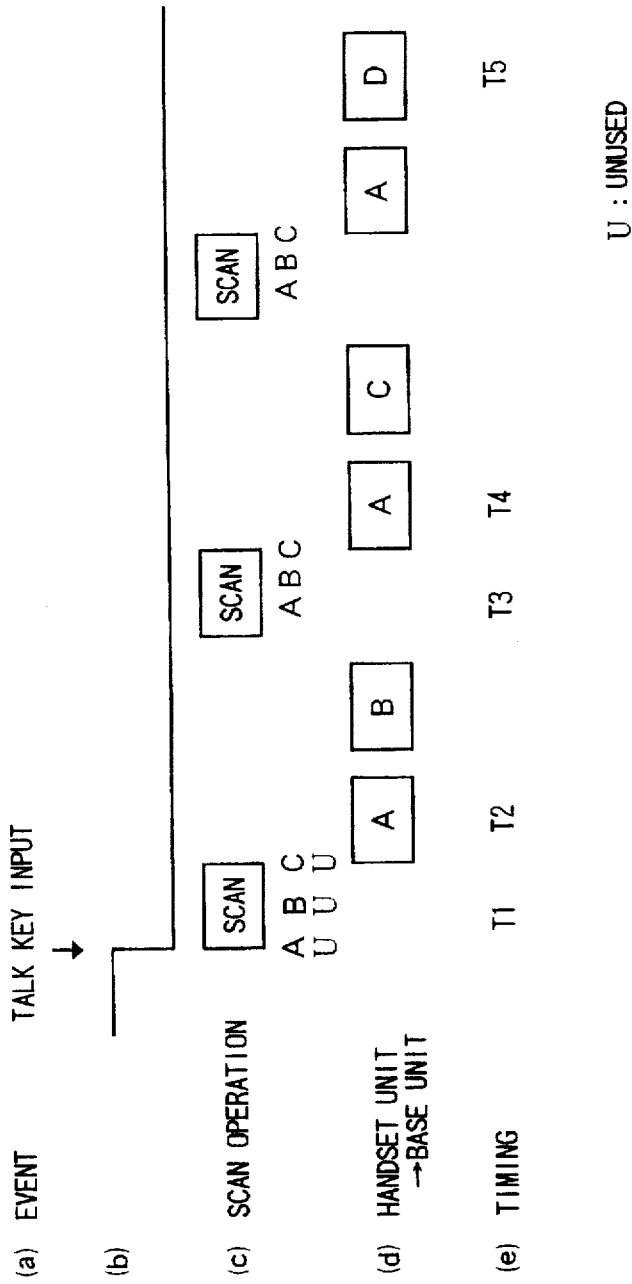
FIG. 10 is a timing chart (1) for explanation of detailed operations in radio channel selection according to a sequence for establishing call connection when the handset unit is a calling side.

FIG. 10 shows a case where it is confirmed as a result of scanning for an unused radio channel that all radio channels in group A, group B, and group C are unused. In this case, as a principle, transmission request code transmitted from a handset unit to a base unit is transmitted by successively using unused radio channels in group A and group B and a radio channel having a specified group number in group C and group D as a transmission radio channel.

For this reason transmission request code may be transmitted at timing T2 by circulating a transmission radio channel according to an order of preference of group A to group B to group C and to group D, but as described later with reference to FIG. 11 to FIG. 13, sometimes combination of radio channel groups used for transmission varies according to a result of scanning for unused radio channels, and with a method in which transmission is executed simply by circulating a transmission radio channel, it is required to prepare a number of processing flows each corresponding to each result of scanning, which in turn results in increase of required programs and system operation becomes more complicated.

Transmission of transmission request code is repeatedly executed until transmission request ACK code is sent from a base unit, but there exists a possibility of "simultaneous transmission" in which, during the period, such an event as placement of incoming call occurs in a base unit and the base unit tries to execute transmission using the same transmission radio channel as that being used by a handset unit for transmission of transmission request code, and it is necessary to take necessary measures against this simultaneous transmission.

To solve the various problems as those described above, in the present embodiment, the following method is employed for transmission of transmission request code in the present invention.

Namely, after a first scan for detecting an unused radio channel is executed, transmission request code is successively transmitted to a first transmission radio channel and then to a second transmission radio channel at timing T2 and on, a second scan is executed at timing T3 to prevent simultaneous transmission, and after the second scan is executed, at timing T4 and on transmission request code is successively transmitted to a third transmission radio channel and then to a fourth transmission radio channel, and furthermore a third scan is executed to prevent simultaneous transmission, and after the third scan is executed, transmission request code is successively transmitted to a fifth transmission radio channel and then to a sixth transmission radio channel. A series of operations as described above (actually for about 12 sec) is executed repeatedly.

Herein, the first, third and fifth transmission radio channels become an unused radio channel group with the highest order of preference (group A in FIG. 10) when there is an unused radio channel in the first radio channel group (group A, group B), or becomes the second radio channel group (group C) when there is no unused radio channel in the first radio channel group, or becomes the third radio channel group (group D) when there is no unused radio channel in the first radio channel group nor in the second radio channel group.

The second transmission radio channel becomes an unused radio channel group (group B in FIG. 10) having the second-highest order of preference when there is any unused radio channel in the first radio channel group (group A, group B), or becomes the second radio channel group (group C) when there is only one unused radio channel in the first radio channel group, or becomes the third radio channel group (group D) when there is no unused radio channel group.

The fourth transmission radio channel becomes, when there is any unused radio channel in the first radio channel group (group A, group B), an unused radio channel group having the third-highest order of preference in the radio channel group (this case is not applicable to the present embodiment), or becomes a second radio channel group (group C in FIG. 10) when there are two unused radio channels in the first radio channel group, or becomes a third radio channel group (group D) when there is only one unused radio channel in the first radio channel group.

Furthermore, the sixth transmission radio channels becomes, when there is any unused radio channel in the first radio channel group (group A, group B), an unused radio channel group having the third-highest order of preference in the group (this case is not applicable to the present invention), or becomes a third radio channel group (group D in FIG. 10) in a case where there are two unused radio channels in the first radio channel group, or in a case where there is no unused radio channel in the first radio channel group.

It should be noted that, as this technique assumes a case where the first, second, and third scans are executed, if the first radio channel group is divided to 4 or more groups, this technology becomes not effective because the necessity for the second transmission radio channel to become a transmission radio channel never occurs.

In the second and third scans executed for prevention of simultaneous transmission, squelch check is executed by the squelch circuit 206 for group A, group B and group C, and if there is a busy radio channel, after a prespecified period of time has passed, code transmitted with the radio channel frequency (ID code) is decoded to determine whether the code transmission is for the radio channel. Namely if transmission is executed from a base unit to the handset unit, it indicates that simultaneous transmission has been generated, and in this case, call connection from the handset unit is disconnected, and necessary countermeasures as responding to receiving request from the base unit or the like must be taken.

For this reason, in the present embodiment, in the second and third scans for prevention of simultaneous transmission, squelch check is executed by the squelch circuit 206 for group A, group B, and group C, and if the result is different from that of the first scan, necessary measures can be taken for executing correct radio channel selection by, for instance, changing a subsequent transmission radio channel.

Furthermore, in the case shown in FIG. 10, the sixth transmission radio channel becomes a third radio channel group (group D), by preparing the third radio channel group (group D) as a candidate for transmission radio channel, necessary countermeasures can quickly be taken in such cases where a specified group number in a base unit is different from that in a handset unit, or where even if a call is transmitted through a transmission radio channel recognized as unused, there is no response from the receiving side.

Figure 11:
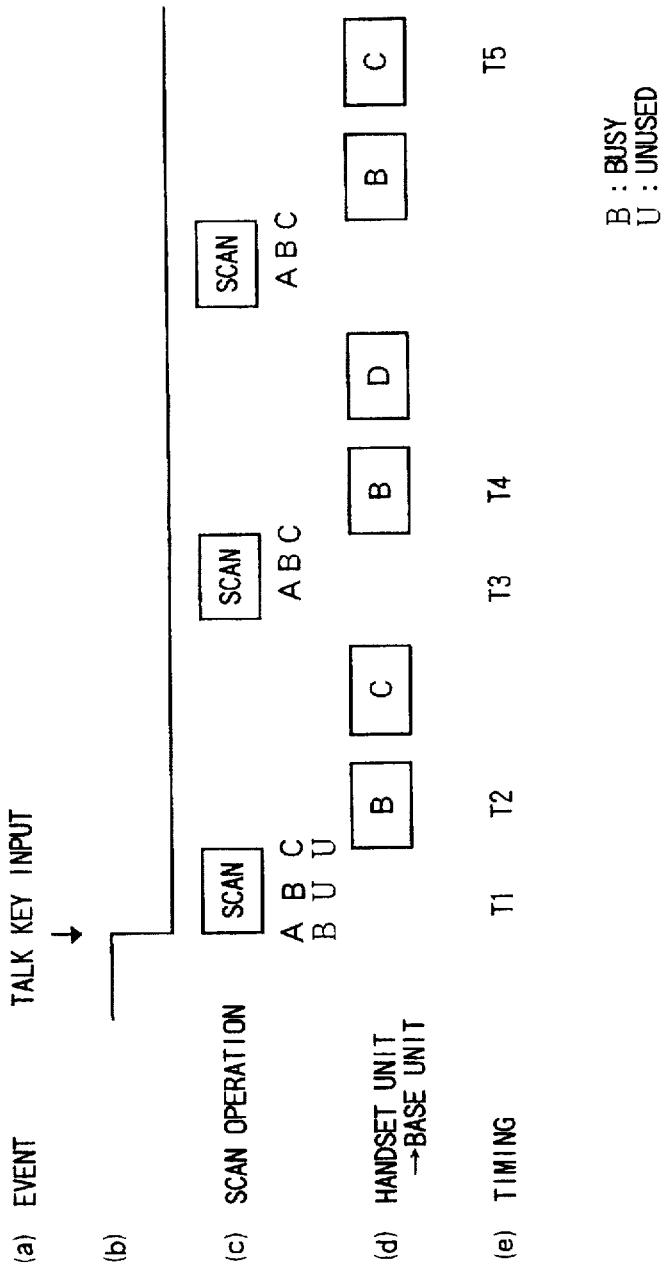
FIG. 11 is a timing chart (2) for explanation of detailed operations in radio channel selection according to a sequence for establishing call connection when the handset unit is a calling side.

FIG. 11 shows a case where, as a result of scanning for unused radio channels like in FIG. 10, group A is recognized as "busy radio channel", and groups B and C as "unused radio channels", and in this case, the first, third, and fifth transmission radio channels become group B, the second and sixth transmission radio channels becomes group C, and the fourth transmission radio channel becomes group D.

Figure 12:
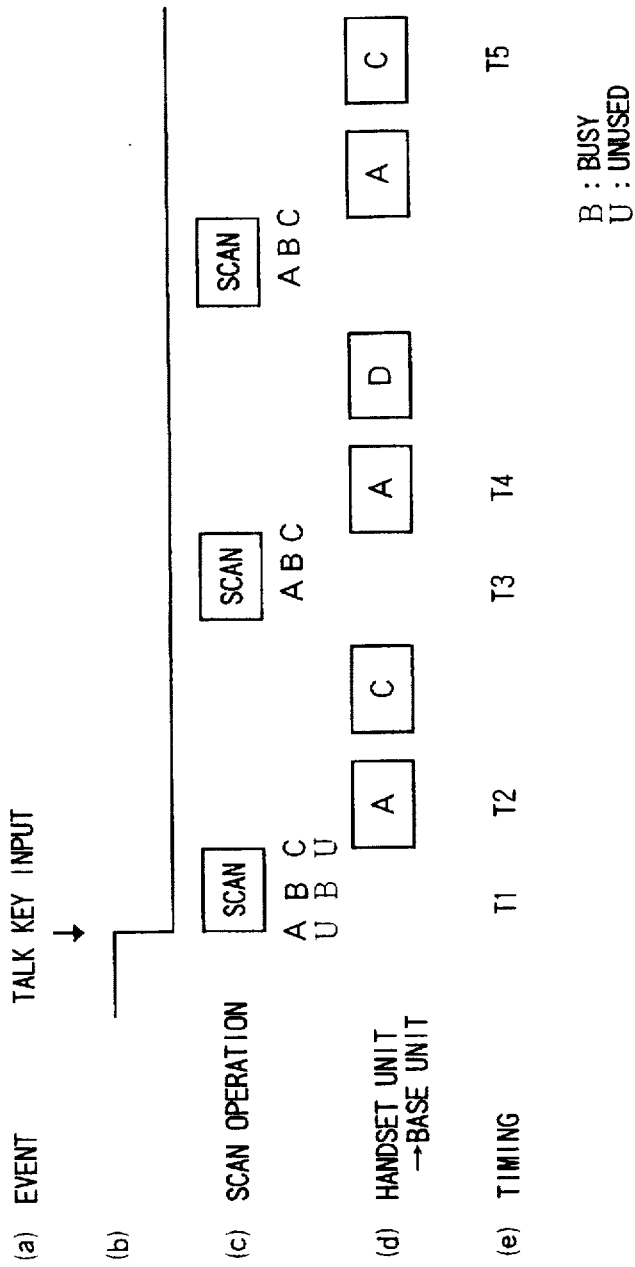
FIG. 12 is a timing chart (3) for explanation of detailed operations in radio channel selection according to a sequence for establishing call connection when the handset unit is a calling side.

FIG. 12 shows a case where, as a result of unused radio channel scanning like in FIG. 10, group A and group C are recognized as "unused radio channels", and group B is recognized as "busy radio channel", and in this case, the first, third and fifth transmission radio channels become group A, the second and sixth transmission radio channels become group C, and the fourth transmission radio channel becomes group D.

Figure 13:
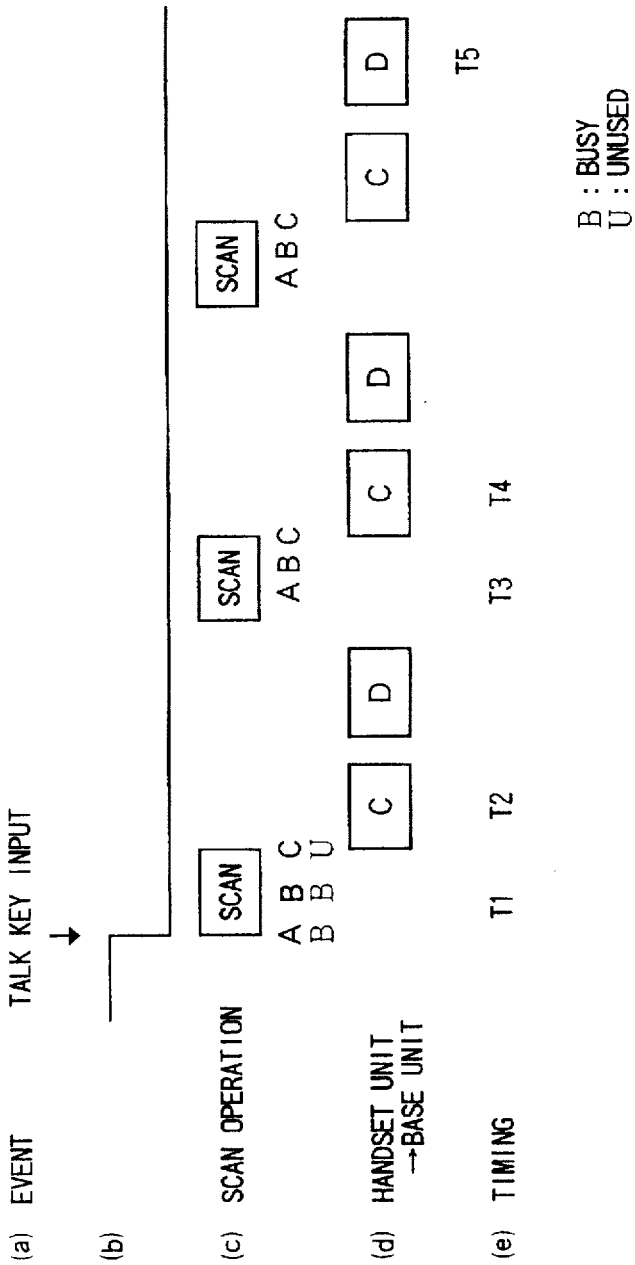
FIG. 13 is a timing chart (4) for explanation of detailed operations in radio channel selection according to a sequence for establishing call connection when the handset unit is a calling side.

Furthermore, FIG. 13 shows a case where, as a result of unused radio channel scanning like in FIG. 10, group A and group B are recognized as "busy radio channels" and group C is recognized as "unused radio channel", and in this case the first, third, and fifth transmission radio channels become group C, and the second, fourth, and sixth transmission radio channels become group D.

[Detailed description of radio channel selection when a base unit is a calling side]

Figure 14:
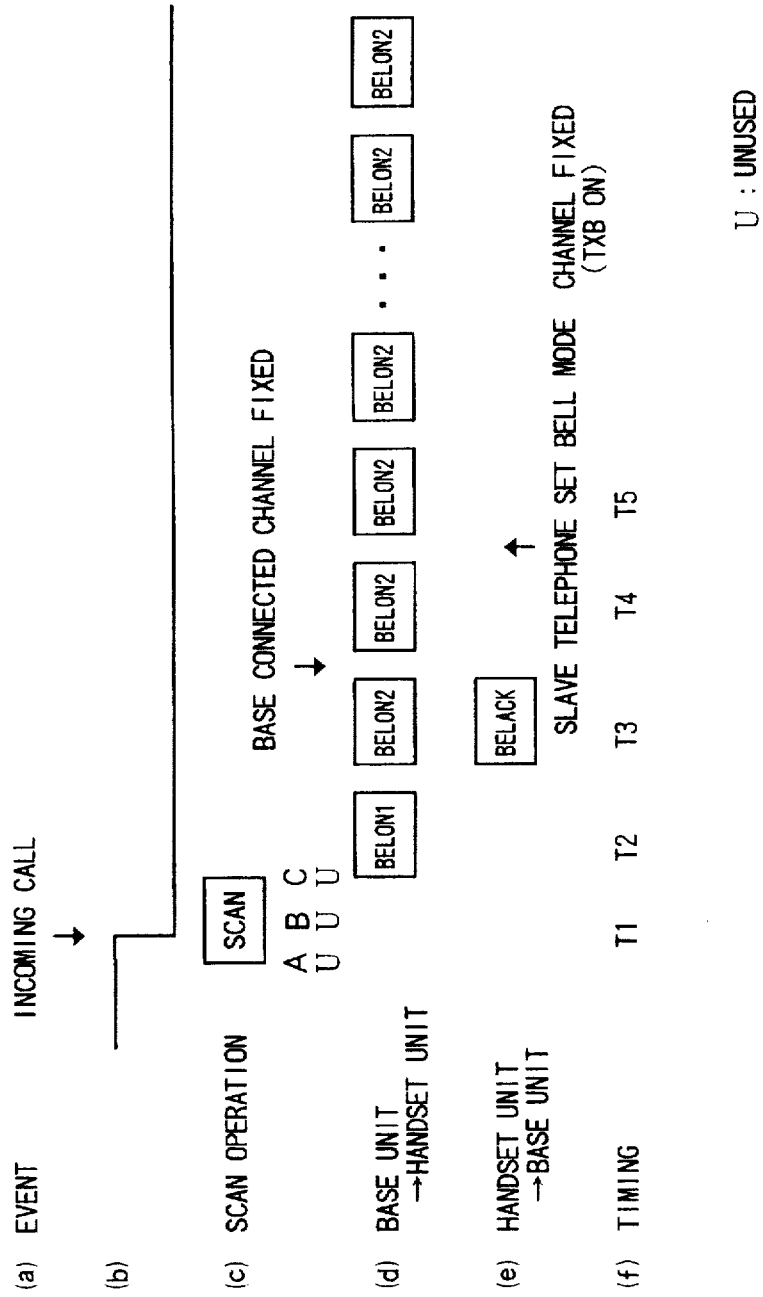
FIG. 14 is a timing chart (1) for explanation of detailed operations in radio channel selection according to a sequence for establishing call connection when the base unit is a calling side.
Figure 15:
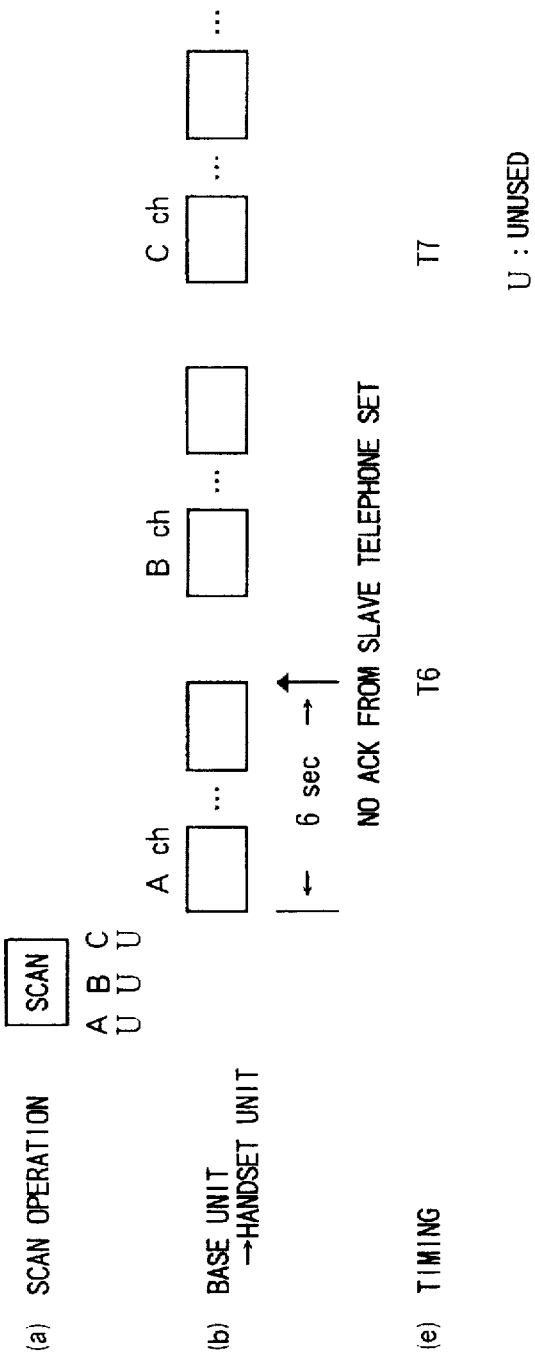
FIG. 15 is a timing chart (2) for explanation of detailed operations in radio channel selection according to a sequence for establishing call connection when the base unit is a calling side.

General contents of the processing flow after an incoming call placement is executed in a base unit and a bell ring alerting a user is generated until call connection is established was described above with reference to FIG. 9, and in this paragraph detailed description is made for an operation for radio channel selection according to a call connection sequence when a base unit is a calling side with reference to the timing charts shown in FIG. 14 and FIG. 15.

At first, when an incoming call is received (Refer to FIG. 14(a)), at timing T1 (Refer to FIG. 14(f)), scanning is executed to detect an unused radio channel by means of squelch check by the squelch circuit 106 in a base unit. Scanning is executed for corresponding radio channels in the first radio channel group (group A, group B) and second radio channel group (group C) according to a specified group number stored in the second storage unit.

FIG. 14 shows a case where, as a result of scanning for an unused radio channel, all radio channels in group A, group B and group C are recognized as "unused radio channels". In this case, receiving request code from a base unit to a handset unit is transmitted by successively using unused radio channels in group A and group B as well as radio channels having a specified group number in group C.

Namely at timing T2, receiving request code BELON1 is successively transmitted to a handset unit by using a radio channel in group A having a higher order of preference of the unused radio channels detected by means of scanning as a transmission radio channel (Refer to FIG. 14(d)). In the side of handset unit, when the receiving request code BELON1 is received (at timing T3), receiving request ACK code BELACK is transmitted to the base unit by using the same radio channel as a transmission radio channel (Refer to FIG. 14(e)).

Then, when the side of base unit receives the receiving request ACK code BELACK, the current transmission radio channel is fixed as a connected radio channel, and at timing T4, receiving code BELON2 is successively transmitted to the handset unit.

Furthermore, when the side of handset unit receives the receiving code BELON2 within a specified period of time (300 [msec]) after transmission of the receiving request ACK code BELACK, the current transmission radio channel is fixed as a connected radio channel, and bell mode is effected (Namely, the transmission system TXB is turned ON to maintain the radio channel).

Also if the receiving code BELON2 is not received within a specified period of time (300 [msec]) after transmission of receiving request ACK code BELACK, scanning operation is repeated, and at a point of time when the receiving code BELON2 is received, the bell mode is effected. It should be noted that, even if the handset unit receives the receiving code BELON2, the receiving request ACK code is not transmitted to the base unit.

FIG. 15 shows a case where, even though the receiving request code BELON1 is successively transmitted from a base unit for a specified period of time (6 [msec]) to a handset unit by using a radio channel having the highest order of preference in group A as a transmission radio channel, receiving request ACK code BEALCK is not received (at timing T6) from the handset unit, and then receiving request code is transmitted by using a radio channel having the highest order of preference in group B as a transmission radio channel.

Also in transmission of receiving request code through a radio channel in group B, if the receiving request ACK code BELACK is not received within a specified period of time, the receiving request code is transmitted by using a radio channel having the highest order of preference in group C as a transmission radio channel (at timing T7). It should be noted that, in this case, the transmission radio channel in group C is fixed as a connected radio channel and radio channel change is not executed later.

Also it should be noted that the handset unit in the present embodiment executes a scanning operation by intermittently receiving, and if it is assumed that the specified period of time is 6 [sec], the scanning operation is executed 3 times.

[Others, radio channel frequency, initial setting etc.]

FIG. 16 shows correspondence between radio channel numbers treated in the present embodiment and radio channel numbers according to the FCC regulation and a transmission frequency (central frequency in each band) for a handset unit as well as for a base unit in each radio channel.

As described in relation to FIG. 3, radio channels #11 to #25 in the first radio channel group is a group of new radio channels which have become available under the new FCC regulation (radio channels #1 to #15 under the existing FCC regulation), and the radio channels can not be selected if the radio channels are being used by a device other than the cordless telephone.

The radio channels #1 to #10 in the second radio channel group are radio channels allocated under the existing FCC regulation (radio channels #16 to #25 under the new FCC regulation), which are old radio channels selectable regardless of whether the radio channels are being used by other device or not.

Also as shown in FIG. 16, a transmission frequency used when transmission is made from a handset unit to a base unit, and a transmission frequency used when transmission is made from a base unit to a handset unit are set for each radio channel, and also in the present embodiment, frequencies satisfying this requirement are used.

Next description is made for initial setting of specified group numbers just after power is turned ON. As described above, the second memory unit (such as SRAM) for storing therein specified group numbers is provided in each of the base unit and handset unit, and the contents is set as described below, when the handset unit is placed on the base unit for batteries to be charged.

Namely, in about 1 [sec] after the handset unit not charged yet (with nothing set in the second memory unit) is placed on a charging terminal of the base unit and charging is started, the radio channels (#1, #4, #8, #9, #10) in the second radio channel group are set at random, and radio channel data set through the charging terminal is transmitted to the salve telephone set.

It should be noted that, when charging is started during call connection, connected radio channel data for the call is transferred. According to the transferred radio channel data, specified group numbers are set.

During ordinary operation, in about 1 [sec] after charging is started, each radio channel is scanned for an unused radio channel according to the specified group numbers currently being stored in the second memory unit, and data for radio channels having the highest order of preference in each group are transferred to a handset unit through the charging terminal.

It should be noted that, during call connection, data for connected radio channel for the call is transferred. A specified group number is set according to the transferred radio channel data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cordless telephone having a base unit and a handset unit and executing communications by selecting one radio channel from a plurality of radio channels for communications between said base unit and said handset unit upon initiation of communications, wherein said plurality of radio channels include a first radio channel group having channel(s) permitted to be used for communications in said cordless telephone only when not used by another radio product and a second radio channel group available for communications of said cordless telephone regardless of whether said second radio channel group is used by the radio product, and said base unit and/or said handset unit comprises:

a first memory unit for storing therein a plurality of radio channels belonging to said first radio channel group and a plurality of second radio channels belonging to said second radio channel group;

a determining unit for determining whether a specified radio channel is being used by the radio product or not;

a control unit for specifying prior to start of said communications at least one of said plurality of radio channels belonging to said first radio channel group stored in said first memory unit and demanding, upon initiation of communications, said determining unit to determine whether said selected radio channel is being used by the radio product, selecting said specified radio channel if it is determined that said specified radio channel is not being used by the radio product, otherwise selecting one of said plurality of radio channels belonging to said second radio channel group stored in said first memory unit; and wherein said plurality of radio channels are divided to a first row comprising said first radio channel group and a second row comprising said second radio channel group and stored in a related form as a radio channel matrix having a group number with lines therein specified in said first memory unit, said base unit and/or said handset unit has a second memory unit for storing therein said specified group number, and said control unit specifies a radio channel, an element of a line corresponding to a specified group number stored in said second memory unit in a first row on said radio channel matrix, and demanding said determining unit to determine whether said radio channel is being used or not by radio product, selecting said specified radio channel if it is determined that said specified radio channel is not being used by the radio product, or otherwise selecting a radio channel, an element of a line corresponding to said specified group number in a second row of said radio channel matrix.

2. A cordless telephone according to claim 1, wherein said base unit and/or said handset unit has a specified group changing unit for changing a specified group number stored in said second memory unit, when a specified key is depressed, according to a preset cyclic sequence for changing said specified group; and said control unit changes, in association with change of said specified group, said selected radio channel to a radio channel, an element of a line corresponding to said changed specified group number in a row of said radio channel matrix in which said selected radio channel was selected.

3. A cordless telephone according to claim 1, wherein said plurality of radio channels include a third radio channel group including the same elements as those of said second radio channel group;

said this radio channel group is allocated in said final row of said radio channel matrix;

elements in each line in said row are the same as elements decided on a row in which a second radio channel group of said radio channel matrix is allocated with a specified group number one ahead of a specified group number corresponding to said line according to said cyclic sequence for changing a specified group; and said control unit selects a radio channel, an element of a line corresponding to said specified group number in a row corresponding to a second radio channel group of said radio channel matrix, and then if any trouble occurs in communications with selected radio channel group, selects a radio channel, an element of a line corresponding to said specified group number in a row corresponding to a third radio channel group of said radio channel matrix.

4. A cordless telephone according to claim 1, wherein said handset unit has a talk key depressed by a user when communications is started;

a control unit in said handset unit demands, when said talk key is depressed, said determining unit to determine whether an unused radio channel is present or not in said first radio channel group according to a specified group number stored in a second memory unit in said handset unit, and sequentially transmits an unused radio channel in said first radio channel group and radio channels corresponding to said specified groups in said second radio channel group and/or said third radio channel group to said base unit; and a control unit in said base unit uses one of said radio channels transmitted from said handset unit as a selected radio channel for communications between said base unit and said handset unit.

5. A cordless telephone according to claim 1, wherein a control unit in said base unit demands, when an incoming call is received, said determining unit to determine whether an unused radio channel is present or not in said first radio channel group according to a specified group number stored in said second memory unit in said base unit, sequentially transmits for a prespecified period of time an unused radio channel in said first radio channel group, and a radio channel corresponding to said specified group in said second radio channel group and/or said third radio channel group to said handset unit, and uses a radio channel being transmitted from said base unit when a response signal from said handset unit is received as a selected radio channel for communications between said base unit and said handset unit.

6. A cordless telephone according to claim 1, wherein selection from a radio channel belonging to said second radio channel group executed by said control unit is executed regardless of determination by said determining unit.

7. A cordless telephone having a base unit and a handset unit and executing communications by selecting one radio channel from a plurality of radio channels for communications between said base unit and said handset unit upon initiation of communications, wherein said plurality of radio channels include a first radio channel group having channel(s) permitted to be used for communications in said cordless telephone only when not used by another radio product and a second radio channel group available for communications of said cordless telephone regardless of whether said second radio channel group is used by the radio product, and said base unit and/or said handset unit comprises:

a first memory unit for storing therein a plurality of radio channels belonging to said first radio channel group and a plurality of second radio channels belonging to said second radio channel group;

a determining unit for determining whether a specified radio channel is being used by the radio product or not;

a control unit for specifying prior to start of said communications at least one of said plurality of radio channels belonging to said first radio channel group stored in said first memory unit and demanding, upon initiation of communications, said determining unit to determine whether said selected radio channel is being used by the radio product, selecting said specified radio channel if it is determined that said specified radio channel is not being used by the radio product, otherwise selecting one of said plurality of radio channels belonging to said second radio channel group stored in said first memory unit;

wherein said first radio channel group is divided to n pieces (n: a given positive integer) of radio channel groups;

said plurality of radio channels are stored in said first memory unit in a related form as a radio channel matrix having a group number with lines therein specified by sequentially allocating a first row to n-th row to n pieces of radio channel groups from a first to n-th radio channel groups in said first radio channel group and specifying a (n+1)th row as said second radio channel group;

said base unit and/or said handset unit has a second memory unit for storing therein said specified group number; and said control unit specifies each radio channel, an element of a line corresponding to a specified group number stored in said second memory unit for said first to n-th rows in said radio channel matrix in an ascending order, demands said determining unit to determine whether each specified radio channel is being used by radio product or not, selects said specified radio channel if it is determined that said specified radio channel is not being used by said radio product, and selects a radio channel, an element of a line corresponding to said specified group number in said (n+1)th row of said radio matrix if it is determined that any radio channel group corresponding to any of said first to n-th rows in said radio channel matrix is being used.

8. A cordless telephone according to claim 7, wherein said base unit and/or said handset unit has a specified group changing unit for changing a specified group number stored in said second memory unit, when a specified key is depressed, according to a preset cyclic sequence for changing said specified group; and said control unit changes, in association with change of said specified group, said selected radio channel to a radio channel, an element of a line corresponding to said changed specified group number in a row of said radio channel matrix in which said selected radio channel was selected.

9. A cordless telephone according to claim 7, wherein said plurality of radio channels include a third radio channel group including the same elements as those of said second radio channel group;

said this radio channel group is allocated in said final row of said radio channel matrix;

elements in each line in said row are the same as elements decided on a row in which a second radio channel group of said radio channel matrix is allocated with a specified group number one ahead of a specified group number corresponding to said line according to said cyclic sequence for changing a specified group; and said control unit selects a radio channel, an element of a line corresponding to said specified group number in a row corresponding to a second radio channel group of said radio channel matrix, and then if any trouble occurs in communications with selected radio channel group, selects a radio channel, an element of a line corresponding to said specified group number in a row corresponding to a third radio channel group of said radio channel matrix.

10. A cordless telephone according to claim 7, wherein said handset unit has a talk key depressed by a user when communications is started;

a control unit in said handset unit demands, when said talk key is depressed, said determining unit to determine whether an unused radio channel is present or not in said first radio channel group according to a specified group number stored in a second memory unit in said handset unit, and sequentially transmits an unused radio channel in said first radio channel group and radio channels corresponding to said specified groups in said second radio channel group and/or said third radio channel group to said base unit; and a control unit in said base unit uses one of said radio channels transmitted from said handset unit as a selected radio channel for communications between said base unit and said handset unit.

11. A cordless telephone according to claim 7, wherein a control unit in said base unit demands, when an incoming call is received, said determining unit to determine whether an unused radio channel is present or not in said first radio channel group according to a specified group number stored in said second memory unit in said base unit, sequentially transmits for a prespecified period of time an unused radio channel in said first radio channel group, and a radio channel corresponding to said specified group in said second radio channel group and/or said third radio channel group to said handset unit, and uses a radio channel being transmitted from said base unit when a response signal from said handset unit is received as a selected radio channel for communications between said base unit and said handset unit.

12. A cordless telephone according to claim 7, wherein selection from a radio channel belonging to said second radio channel group executed by said control unit is executed regardless of determination by said determining unit.

13. A cordless telephone having a base unit and a handset unit and executing communications by selecting one radio channel from a plurality of radio channels for communications between said base unit and said handset unit upon initiation of communications,
  wherein said plurality of radio channels include a first radio channel group having channel(s) permitted to be used for communications in said cordless telephone only when not used by another radio product and a second radio channel group available for communications of said cordless telephone regardless of whether said second radio channel group is used by the radio product, and said base unit and/or said handset unit comprises:
    a first memory unit for storing therein a plurality of radio channels belonging to said first radio channel group and a plurality of second radio channels belonging to said second radio channel group;
    a determining unit for determining whether a specified radio channel is being used by the radio product or not;
    a control unit for specifying prior to start of said communications at least one of said plurality of radio channels belonging to said first radio channel group stored in said first memory unit and demanding, upon initiation of communications, said determining unit to determine whether said selected radio channel is being used by the radio product, selecting said specified radio channel if it is determined that said specified radio channel is not being used by the radio product, otherwise selecting one of said plurality of radio channels belonging to said second radio channel group stored in said first memory unit; and
  wherein said control unit in either one of said base unit or said handset unit selects said specified radio channel belonging to said first radio channel group, has communications executed between either said base unit or said handset unit and a remaining one through said radio channel, and determines, if a response signal is received from said remaining one within a prespecified period of time, that communications has been established, has communications between said base unit and said handset unit executed continuously through said radio channel, and selects, if a response signal from said remaining one is not received within said prespecified period of time, a radio channel belonging to said second radio channel group and has communications between either said base unit or said handset unit and a remaining one executed.

14. A cordless telephone according to claim 13, wherein said control unit in either said base unit or said handset unit selects a radio channel belonging to said second radio channel group, has communication executed between either said base unit or said handset unit and a remaining one through said selected radio channel, determines, if a response signal from said remaining one is received within said prespecified period of time, that communication has been established, has the communication between said base unit and said handset unit executed through said radio channel continuously, again selects, if a response signal from said remaining one is not received within said prespecified period of time, said specified radio channel belonging to said first radio channel group, and has communication between either said base unit or said handset unit and said remaining one executed.

15. A cordless telephone having a base unit and a handset unit and executing communications by selecting one radio channel from a plurality of radio channels for communications between said base unit and said handset unit upon initiation of communications,
  wherein said plurality of radio channels include a first radio channel group having channel(s) permitted to be used for communications in said cordless telephone only when not used by another radio product and a second radio channel group available for communications of said cordless telephone regardless of whether said second radio channel group is used by the radio product, and said base unit and/or said handset unit comprises:
    a first memory unit for storing therein a plurality of radio channels belonging to said first radio channel group and a plurality of second radio channels belonging to said second radio channel group;
    a determining unit for determining whether a specified radio channel is being used by the radio product or not;
    a control unit for specifying prior to start of said communications at least one of said plurality of radio channels belonging to said first radio channel group stored in said first memory unit and demanding, upon initiation of communications, said determining unit to determine whether said selected radio channel is being used by the radio product, selecting said specified radio channel if it is determined that said specified radio channel is not being used by the radio product, otherwise selecting one of said plurality of radio channels belonging to said second radio channel group stored in said first memory unit;
  wherein said plurality of radio channels have predetermined relationship with first M-th groups each comprising at least one radio channel belonging to said first radio channel group and at least one radio channel belonging to said second radio channel group and are stored in said first memory unit, wherein said base unit or said handset unit has a group specifying unit for specifying any of said first to M-th groups and a second memory unit for storing therein group data identifying said specified group, and
  said control unit specifies a radio channel belonging to said first radio channel group by reference to said group data stored in said second memory unit, and demands said determining unit to determine whether said radio channel is being used by the radio product or not, selects, if said specified radio channel is not being used by the radio product, said specified radio channel, or otherwise selects a radio channel belonging to said second radio channel group constituting a group corresponding to said group data stored in said second memory unit.

16. A cordless telephone according to claim 15, wherein selection from a radio channel belonging to said second radio channel group executed by said control unit is executed regardless of determination by said determining unit.

17. A cordless telephone according to claim 15, wherein said first to M-th groups each include two or more radio channels belonging to said first radio channel group; and
  said control unit specifies radio channels belonging to said first radio channel group constituting a group corresponding to said group data stored in said second memory unit and demands said determining unit to determine whether said radio channel is being used by radio product or not, selects, if any radio channel or radio channels of said specified radio channels are determined as not being used by said radio product, one of said radio channels determined as not being used by said radio product, and selects, if all of said specified radio channels are being used by radio product, a radio channel belonging to said second radio channel group constituting a group corresponding to said group data stored in said second memory unit.

18. A cordless telephone according to claim 15, wherein selection from a radio channel belonging to said second radio channel group executed by said control unit is executed regardless of determination by said determining unit.

19. A cordless telephone according to claim 15, wherein said group specifying unit in either one of said base unit or said handset unit demands, during communications with a remaining one of said base unit or handset unit, change of said group data related to a radio channel being used for said current communications and stored in said second memory unit to other group data identifying any one group of said first to M-th groups other than said group corresponding to said current group data, and a control unit in either one of said base unit or said handset unit responds to a request for change from said group specifying unit and alerts a remaining of said base unit or said handset unit through said radio channel being used for said current communication that data stored in said second memory unit is changed to said other group data, changes, only when a response signal corresponding to said change is received from said remaining one, data stored in said second memory unit to said other group data, and after said change is complete, has communication with any remaining one of said base unit or said handset unit executed through a radio channel belonging to said second radio channel group related to said other group data.

20. A cordless telephone according to claim 19, wherein a control unit in either one of said base unit or said handset unit responds to said request for change and executes selection of other group data identifying any one group of said first to M-th groups other than said group corresponding to said group data stored in said second memory unit according to a prespecified order.

21. A cordless telephone according to claim 20, wherein said second memory unit stores said group data before change even after execution of said change.

22. A cordless telephone according to claim 15, wherein a plurality of radio channels each related to each group of said first to M-th groups are respectively assigned a prespecified order of preference, said order of preference allocated to radio channels in a first radio channel group and those in a second radio channel group in each of said groups; and said control unit in either one of said base unit or said handset unit selects a radio channel having a higher order of preference of said specified radio channels not being used by said radio product and belonging to said first radio channel group and has communication with a remaining one of said base unit or handset unit executed through said radio channel, determines, if a response signal from said remaining one is received within a prespecified period of time, that said communication has been established, has said communication between said base unit and said handset unit executed continuously through said radio channel, selects, if a response signal from said remaining one is not received within said prespecified period of time, a radio channel excluding said radio channels belonging to said first radio channel group and being used by said radio product according to said order of preference and has communication with any remaining one of said base unit or said handset unit executed.

23. A cordless telephone according to claim 22, wherein said control unit in either said base unit or said handset unit selects a radio channel having said lowest order of preference and has communication with any remaining one of said base unit or said handset unit executed through said radio channel, determines, if a response signal from said remaining one is received within a prespecified period of time, that said communication has been established, has said communication between said base unit and said handset unit executed through said radio channel continuously, again selects, if a response signal from said remaining one is not received within said prespecified period of time, said radio channel having a higher order of preference, and has communication with said remaining one of said base unit or said handset unit executed.

24. A cordless telephone according to claim 15, wherein said control unit demands said determining unit to determine whether all said radio channels related to group data stored in said second memory unit are being used by radio product or not.

* * * * *